Patented July 12, 1949

2,476,064

UNITED STATES PATENT OFFICE 2,476,064

HYDROCARBON POLYMERIZATION PRODUCTS AND PROCESS OF MAKING AND USING THE SAME

Bruce L. Ritz, Norwood, and Herbert L. Johnson, Media, Pa., assignors to Sun Oil Company, Philadelphia, Pa., a corporation of New Jersey No Drawing. Application December 11, 1945, Serial No. 634,392

13 Claims. (Cl. 260—45.5)

This invention relates to a novel copolymer product, adapted to be compounded as a tackifier with synthetic rubber of the butadiene-styrene type, characterized by substantially complete hydrocarbon solubility and by absence of any substantial quantity of oily, low molecular weight polymers, comprising the copolymer of a monomeric mixture of a non-conjugated iso-olefin of 4-6 carbon atoms having a double bond in the alpha position and a hydrocarbon group or side chain in the beta position, an aliphatic 1,3-conjugated diolefin, a vinyl substituted aryl compound, and one or more aliphatic olefins of 3-5 carbon atoms other than said iso-olefin, and to the preparation of said copolymer product as well as to its compounding with said synthetic rubber.

In Serial No. 596,099, filed May 26, 1945, by Stewart S. Kurtz, Jr., there is described the preparation of a copolymer product by the polymerization of a three component mixture comprising an iso-olefin of 4-6 carbon atoms having a double bond in the alpha position and a side chain in the beta position, an aliphatic 1,3-conjugated diolefin, and a vinyl substituted aryl compound employing a Friedel-Crafts type catalyst at sub-zero Centigrade temperatures. The product there obtained comprises oily, low molecular weight polymer in substantial quantities, that is to say, more than about 10% by weight of the product, when the monomers are employed in relative quantities such that a completely hydrocarbon soluble product will be obtained. When the monomers are employed in relative quantities such that the formation of any substantial quantities of oily, low molecular weight polymers is avoided, the product is not completely hydrocarbon soluble. In order that a copolymer product be well adapted to compounding with synthetic rubbers of the butadiene-styrene type both the formation of oily, low molecular weight polymers, which cause sticking to the mills and calenders and the formation of hydrocarbon insoluble fractions which will not allow a uniform blend to be obtained, are to be carefully avoided.

According to the present invention an elastomer copolymer product is obtained which is characterized by substantially complete hydrocarbon solubility and by the absence of any substantial quantity of oily, low molecular weight polymers.

The product of the present invention possesses tackifier properties when milled together with butadiene-styrene type rubbers. An advantage of the product of the present invention is that in its preparation, as described hereinafter, certain characteristics can be imparted thereto to render it compatible with the various synthetic rubbers with which it can be compounded. These characteristics which are of paramount importance are such that the final cured blend of the product and the synthetic rubber will be physically homogeneous. Also, the rate of cure of the product can be made to approximate that of the synthetic rubber with which it is compounded thereby avoiding overcuring of either the tackifier elastomer or the synthetic rubber in the blend during vulcanization. Accordingly the elastomer copolymer product of the present invention is useful as a tackifier for synthetic rubbers of the butadiene-styrene type.

According to the invention the elastomer copolymer product is obtained by polymerizing a mixture of monomers comprising about 15–80, preferably 30–50, parts by weight of a non-conjugated iso-olefin of 4–6 carbon atoms having a double bond in the alpha position and a hydrocarbon group or side chain in the beta position, about 10–50, preferably 25–45, parts by weight of an aliphatic 1,3-conjugated diolefin preferably having from 4–6 carbon atoms, about 5–50, preferably 10–30, parts by weight of a vinyl substituted aryl compound and at least about 10 parts by weight but not more than about twice the amount of said iso-olefin present of an aliphatic mono-olefin of 3–5 carbon atoms other than said iso-olefin dissolved in a suitable solvent at subzero centigrade temperature employing a Friedel-Crafts type catalyst.

The parts by weight of the monomers employed will vary depending upon the conditions obtaining during the polymerization. However, polymerizing conditions and relative quantities of monomers present in the monomeric mixture will, in any event, be correlated, within the limits defined herein, with an elastomer copolymer having any particular tackifier properties desired, and will be those which render the elastomer copolymer compatible with any particular synthetic rubber of the butadiene-styrene type employed. Sufficient double bonds must be present in the product to impart to it a chemical compatibility with the synthetic rubber with respect to rate of cure. Sufficient aromatic rings must be present to impart to the product compatibility with said synthetic rubber with respect to physical homogeneity on curing therewith. These factors must be taken into consideration when selecting the proportions and conditions to be employed in the preparation of the copolymer product of this invention.

The monomers employed in the preparation of the present copolymer are as follows: (A) As the non-conjugated iso-olefins of 4–6 carbon atoms having a double bond in the alpha position and a hydrocarbon group or side chain in the beta position there can be employed the following compounds: 2 methyl propene-1; 2-methyl butene-1; 2 methyl pentene-1; 2,3 dimethyl pentene-1; 2 ethyl butene-1; 2 methyl pentadiene 1, 4, or mixtures thereof; (B) As the aliphatic 1,3-conjugated diolefin preferably having from 4–6 carbon atoms, there can be employed the following compounds: butadiene; 2 methyl butadiene; pentadiene 1,3; and 2,3 dimethyl butadiene, or mixtures thereof; (C) The vinyl substituted aryl compounds employed are styrene, para methyl styrene; meta methyl styrene and the corresponding ethyl compounds, or mixtures thereof; (D) As the aliphatic olefin, having 3–5 carbon atoms, other than said non-conjugated iso-olefin, there can be employed propene; butene-1; butene-2; pentene-1 and pentene-2; 3 methyl butene-1 and 2 methyl butene-2, or mixtures thereof. The parts by weight employed will be in the ranges stated above. When the quantity of iso-olefin, described in above group (A), employed is without the stated range the copolymer will lack desired tackifying properties. When the 1,3 aliphatic conjugated diolefin, described in above group (B), is employed in a quantity which is less than the lower limit stated the product lacks sufficient unsaturation to provide for proper vulcanization and if the upper limit is exceeded the product is not homogeneous and is not completely hydrocarbon soluble. When the vinyl substituted aryl compound, described in above group (C), is employed in a quantity less than the lower limit stated the product lacks compatibility with the butadiene-styrene type synthetic rubber and if the quantity is above the upper limit the product formed is a thermo-plastic resin. When the aliphatic olefin other than said iso-olefin of group (A), as described in above group (D), is employed in an amount less than the stated lower limit the product will lack tackifier properties or hydrocarbon solubility and when it is employed in a quantity greater than the upper limit the product will contain excessive amounts of oily, low molecular weight polymers. Good results have been obtained employing 40 parts 2 methyl propene-1; 40 parts butadiene 1,3; 20 parts styrene; and 287 parts of a mixture containing 80 parts of butene-1 and butene-2.

The polymerization of the monomeric mixture is suitably effected employing a solvent or diluent therefore since the polymerization takes place rapidly with liberation of heat and means must be provided for absorbing and dissipating the heat generated. This can be done most conveniently by employing a material such as a liquified, normally gaseous hydrocarbon as diluent, and allowing it to vaporize and thus act as a refrigerant. After the polymerization step has been completed the diluent and any unreacted monomers are separated from the copolymers formed. As diluents there can be employed ethylene; ethane; propane; normal butane; and isobutane. Pentenes; hexanes and heptanes can also be employed but to maintain preferred temperatures additional refrigeration will be required.

The temperature employed for the polymerization of the monomeric mixture should be low. For example, temperatures below about minus 10° C., preferably within the range minus 80° C., to minus 30° C. can be employed. The temperature will of course depend upon the boiling point of the diluent or mixtures of diluents employed when these are allowed to boil during the polymerization step. A reflux condenser can be employed or sufficient diluent to allow for loss thereof during the polymerization can be employed. While not at present preferred, it is obvious that additional refrigeration with or without the use of pressure can be employed to regulate the temperature during the polymerization.

As stated a Friedel-Crafts type catalyst is employed. The catalysts which can be employed are aluminum chloride, aluminum bromide and boron trifluoride. These materials are employed in a substantially anhydrous state and when solid are preferably diluted with a solvent prior to being added to the monomeric mixture. The solvents which can be employed are methyl chloride, ethyl chloride and ethylene dichloride when aluminum chloride is the catalyst selected. Saturated hydrocarbon solvents, which may or may not be the diluent employed, can be used when aluminum bromide is the catalyst selected. When aluminum chloride is the catalyst employed, the quantity added to the polymerization mixture must be at least 2 weight percent of the monomers employed (exclusive of the aliphatic olefin other than said iso-olefin which is also employed) and will be preferably in the range 2–8 weight percent. In any event, the quantity of catalyst used must be sufficient to produce a yield of copolymer product within the range 100–125 weight percent, based on the weight of monomers employed (exclusive of the aliphatic olefin other than said iso-olefin which is also employed), preferably 110–120 weight percent, if a copolymer product, characterized by substantially complete hydrocarbon solubility and by absence of any substantial quantity of oily, low molecular weight polymers, is to be obtained. When aluminum bromide is employed as the catalyst the quantity added to the polymerization mixture must be at least 4 weight percent of the monomers employed (exclusive of the aliphatic olefin other than said iso-olefin which is employed) and will be preferably 4–16 weight percent. The yield to be obtained in order that the product will have the characteristics desired should be as already stated. When boron trifluoride is selected as the catalyst the quantity used is limited by the solubility of this gas in the reaction mixture. However addition of this gas to the mixture must be continued until the prescribed yield has been obtained. Hence, it is clear that the quantity of catalyst employed is a specific characteristic of the invention.

The following examples serve to illustrate the invention with respect to the preparation of the copolymer product and indicate the details to be observed in effecting the polymerization.

*Example I*

Into a one gallon Dewar flask were placed 575 grams of liquified refinery $C_4$ stream having the following analysis:

| | Gas, volume percent |
|---|---|
| $C_3$ | 0.6 |
| 2 methyl butane | 22.8 |
| 2 methyl butene-1 | 12.8 |
| Butene-1 and butene-2 (approx. 3:4) | 27.8 |
| Normal butane | 34.8 |
| $C_5$ | 1.2 |
| | 100.0 |

Then were added 6.4 grams of 2 methyl butene-1, 80 grams of butadiene, 40 grams of styrene, and 2 quarts of propane as diluent. The mixture was then stirred and during stirring 6 grams of anhydrous aluminum chloride dissolved in 240 milliliters of ethyl chloride was added continuously over a period of 22 minutes. During this time the propane was allowed to evaporate at atmospheric pressure thus maintaining a reaction temperature of about minus 35° C. After the reaction was completed water was added to destroy the activity of the catalyst and the diluents, solvents and unreacted monomers were evaporated. The copolymer product was washed with water to remove the catalyst. The product was then dehydrated by heating. The yield was 239 grams, that is 119% based on the monomers originally present exclusive of the aliphatic olefins other than the iso-olefins.

The copolymer product had a penetration (A. S. T. M. D-5-25) of 12. By selective adsorption and fractionation, of a pentane solution of the copolymer, employing silica gel as described and claimed in copending application Serial No. 577,144, filed February 9, 1945, by John R. Skeen, now Patent Number 2,462,564, ten fractions of approximately equal weight were prepared and were found to have the following penetrations.

| Fraction | Per Cent of Total | Penetration |
|---|---|---|
| Original | 100 | 12 |
| 1 | 8.2 | 0 |
| 2 | 9.5 | 0 |
| 3 | 9.8 | 0 |
| 4 | 10.0 | 1 |
| 5 | 10.2 | 1 |
| 6 | 10.4 | 1 |
| 7 | 11.1 | 1 |
| 8 | 10.8 | 7 |
| 9 | 8.4 | 141 |
| 10 | 11.6 | 290 |

From the foregoing analysis it is apparent that the copolymer product fractions were substantially of a uniform character and that the product was characterized by absence of any substantial quantity of oily, low molecular weight polymers.

*Example II*

Repeating the procedure of Example I, modified only in that 5 grams of catalyst was employed, a yield of 101½%, calculated as before, was obtained. The product tested as before had a penetration of 23 but upon analysis as before showed penetrations as follows:

| Fraction | Percent of Total | Penetration |
|---|---|---|
| Original | 100 | 23 |
| 1 | 10.6 | 0 |
| 2 | 10.9 | 1 |
| 3 | 11.7 | 2 |
| 4 | 12.6 | 2 |
| 5 | 12.3 | 5 |
| 6 | 12.5 | 8 |
| 7 | 11.7 | 9 |
| 8 | 6.6 | 69 |
| 9 | 2.6 | |
| 10 | 6.5 | [1]550 |

[1] Approx.

The foregoing analysis shows clearly that there is a critical lower limit for the yield of copolymer product to be obtained when uniformity of product fractions is desired, particularly when the formation of oily, low molecular weight polymers is to be avoided.

*Example III*

Repeating the procedure of Example I, modified only in that 12 grams of catalyst was employed, a yield of 152½%, calculated as before, was obtained. The product tested as before had a penetration of 7 but upon analysis as before showed penetrations as follows:

| Fraction | Percent of Total | Penetration |
|---|---|---|
| Original | 100 | 7 |
| 1 | 8.3 | 0 |
| 2 | 9.2 | 0 |
| 3 | 10.3 | 0 |
| 4 | 10.5 | 0 |
| 5 | 11.3 | 1 |
| 6 | 13.6 | 2 |
| 7 | 12.4 | 6 |
| 8 | 9.2 | 40 |
| 9 | 7.6 | [1]870 |
| 10 | 7.6 | [1]1,700 |

[1] Approx.

The foregoing analysis shows clearly that there is a critical upper limit of yield of copolymer product to be obtained when uniformity of product fractions is desired, particularly when the formation of oily, low molecular weight polymers is to be avoided.

*Example IV*

A copolymer product prepared according to Example I was compounded with butadiene-styrene synthetic rubber ("GR-S") according to the following formula.

| | Parts by weight |
|---|---|
| "GR-S" | 85 |
| Copolymer | 15 |
| Carbon black ("Statex B") | 30 |
| Phenyl beta naphthylamine "Agerite" | 1 |
| Zinc oxide | 5 |
| Benzothiazyl 2-monocyclohexyl sulfonamide ("Santocure") | 1.5 |
| Sulfur | 1.75 |

The following table shows compounding results obtained.

| | |
|---|---|
| Tensile strength p. s. i. | 1510 |
| Modulus 300% p. s. i. | 650 |
| Elongation percent | 465 |
| Percent set in 30 seconds | 8 |
| Optimum cure—minutes | 35 |
| Tack | Fair |
| Shore hardness | 37 |
| Bloom | Slight |
| Milling behavior | Good |

We claim:

1. The copolymer of a mixture of monomers consisting of from 15-80 parts by weight of a non-conjugated aliphatic iso-olefin, containing only olefinic unsaturation, of 4-6 carbon atoms having a double bond in alpha position and a side chain in beta position; 15-80 parts by weight of an aliphatic 1,3-conjugated diolefin; 5-50 parts by weight of a vinyl substituted aryl compound and at least 10 parts by weight, but not more than twice the amount of said iso-olefin present, of an aliphatic mono-olefin of 3-5 carbon atoms other than said iso-olefin, said copolymer having inherent tackifier properties characterized by substantially complete hydrocarbon solubility and by absence of any substantial quantity of oily, low molecular weight polymers, said copolymer having been prepared at a sub-zero centigrade temperature employing a Friedel-Crafts catalyst.

2. The copolymer of a mixture of monomers consisting of from 15-80 parts by weight of 2 methyl propane-1; 10-50 parts by weight of butadiene-1,3; 5-50 parts by weight of styrene and at least 10 parts by weight, but not more than twice the amount of said 2 methyl propene present, of a mixture of butene-1 and butene-2, said copolymer having inherent tackifier properties characterized by substantially complete hydrocarbon solubility and by absence of any substantial quantity of oily, low molecular weight polymers, said copolymer having been prepared at a sub-zero centigrade temperature employing a Friedel-Crafts catalyst.

3. The copolymer of a mixture of monomers consisting of from 15-80 parts by weight of 2 methyl propene-1; 10-50 parts by weight of 2 methyl butadiene-1,3; 5-50 parts by weight of styrene and at least 10 parts by weight, but not more than twice the amount of said 2 methyl propene present of a mixture of butene-1 and butene-2, said copolymer having inherent tackifier properties characterized by substantially complete hydrocarbon solubility and by absence of any substantial quantity of oily, low molecular weight polymers, said copolymer having been prepared at a sub-zero centigrade temperature employing a Friedel-Crafts catalyst.

4. A composition of matter comprising a mixture of butadiene-styrene synthetic rubber and a copolymer product according to claim 1.

5. A composition of matter comprising a mixture of butadiene-styrene synthetic rubber and a copolymer product according to claim 2.

6. A composition of matter comprising a mixture of butadiene-styrene synthetic rubber and a copolymer product according to claim 3.

7. A process for the preparation of a copolymer product having inherent tackifier properties and characterized by the presence of sufficient double bonds to impart to the product a chemical compatibility with butadiene-styrene a synthetic rubber with respect to rate of cure and by the presence of sufficient aromatic rings to impart compatibility with said synthetic rubber with respect to physical homogeneity on curing therewith, comprising polymerizing at a sub-zero centigrade temperature a monomeric mixture consisting of 15-80 parts by weight of a non-conjugated aliphatic iso-olefin of 4-6 carbon atoms having a double bond in the alpha position and a hydrocarbon group in the beta position, 10-50 parts by weight of an aliphatic 1,3-conjugated diolefin, 5-50 parts by weight of a vinyl substituted aryl compound, and at least 10 parts by weight, but not more than twice the amount of said non-conjugated iso-olefin present, of an aliphatic mono-olefin, containing only olefinic unsaturation of 3-5 carbon atoms, other than said non-conjugated iso-olefin, in the presence of a Friedel-Crafts catalyst, said catalyst being present in an amount, within the range 2-8 weight percent of the monomers, calculated exclusive of the aliphatic mono-olefin of 3-5 carbon atoms, such that a yield of copolymer product, within the range 100-125 weight percent of the monomers present, calculated exclusive of the aliphatic mono-olefin of 3-5 carbon atoms, will be formed, and separating the copolymer product from the reaction mixture.

8. A process for the preparation of a copolymer product having inherent tackifier properties and characterized by the presence of sufficient double bonds to impart to the product a chemical compatibility with a butadiene-styrene synthetic rubber, with respect to rate of cure and by the presence of sufficient aromatic rings to impart compatibility with said synthetic rubber with respect to physical homogeneity on curing therewith, comprising polymerizing at a sub-zero centigrade temperature a monomeric mixture comprising 30-50 parts by weight of a non-conjugated aliphatic iso-olefin of 4-6 carbon atoms having a double bond in the alpha position and a hydrocarbon group in the beta position, 25-45 parts by weight of an aliphatic 1,3-conjugated diolefin, 10-30 parts by weight of a vinyl substituted aryl compound, and at least 10 parts by weight, but not more than twice the amount of said non-conjugated iso-olefin present, of an aliphatic mono-olefin, containing only olefinic unsaturation of 3-5 carbon atoms, other than said non-conjugated iso-olefin, in the presence of a Friedel-Crafts catalyst, said catalyst being present in an amount, within the range 2-8 weight percent of the monomers, calculated exclusive of the aliphatic mono-olefin of 3-5 carbon atoms, such that a yield of copolymer product, within the range 100-125 weight percent of the monomers present, calculated exclusive of the aliphatic mono-olefin of 3-5 carbon atoms, will be formed, and separating the copolymer product from the reaction mixture.

9. A process according to claim 8 wherein the catalyst employed is anhydrous aluminum chloride dissolved in a solvent and the temperature employed is below about minus 30° C.

10. A process for the preparation of a copolymer product, having inherent tackifier properties and characterized by the presence of sufficient double bonds to impart to the product a chemical compatibility with a butadiene-styrene synthetic rubber with respect to rate of cure and by the presence of sufficient aromatic rings to impart compatibility with said synthetic rubber with respect to physical homogeneity on curing therewith, comprising polymerizing at a temperature below minus 30° C. about 40 parts by weight of 2 methyl propene-1; 40 parts by weight of butadiene-1,3; 20 parts by weight of styrene and 80 parts by weight of butene-1 and butene-2; in the presence of anhydrous aluminum chloride dissolved in ethyl chloride said aluminum chloride being present in about 3 weight percent of the monomers, calculated exclusive of the butene-1 and butene-2, effecting said polymerization to form said copolymer product and separating it from the reaction mixture.

11. In the milling of a butadiene-styrene synthetic rubber, the step of improving tack and plasticity which comprises adding to said synthetic rubber a minor proportion of a copolymer product prepared according to claim 7.

12. In the milling of a butadiene-styrene synthetic rubber, the step of improving tack and plasticity which comprises adding to said synthetic rubber a minor proportion of a copolymer product prepared according to claim 8.

13. In the milling of a butadiene-styrene synthetic rubber, the step of improving tack and plasticity which comprises adding to said synthetic rubber a minor proportion of a copolymer product prepared according to claim 9.

BRUCE L. RITZ.
HERBERT L. JOHNSON.

REFERENCES CITED

The following references are of record in the file of this patent:

UNITED STATES PATENTS

| Number | Name | Date |
|---|---|---|
| 2,023,495 | Thoms | Dec. 10, 1935 |
| 2,122,826 | Van Peski | July 5, 1938 |

FOREIGN PATENTS

| Number | Country | Date |
|---|---|---|
| 106,371 | Australia | Jan. 26, 1939 |
| 513,521 | Great Britain | Oct. 16, 1939 |

OTHER REFERENCES

Chemical Abstracts, vol. 39, 1945, page 5953. Copy in Sci. Libr.